Figure 1:
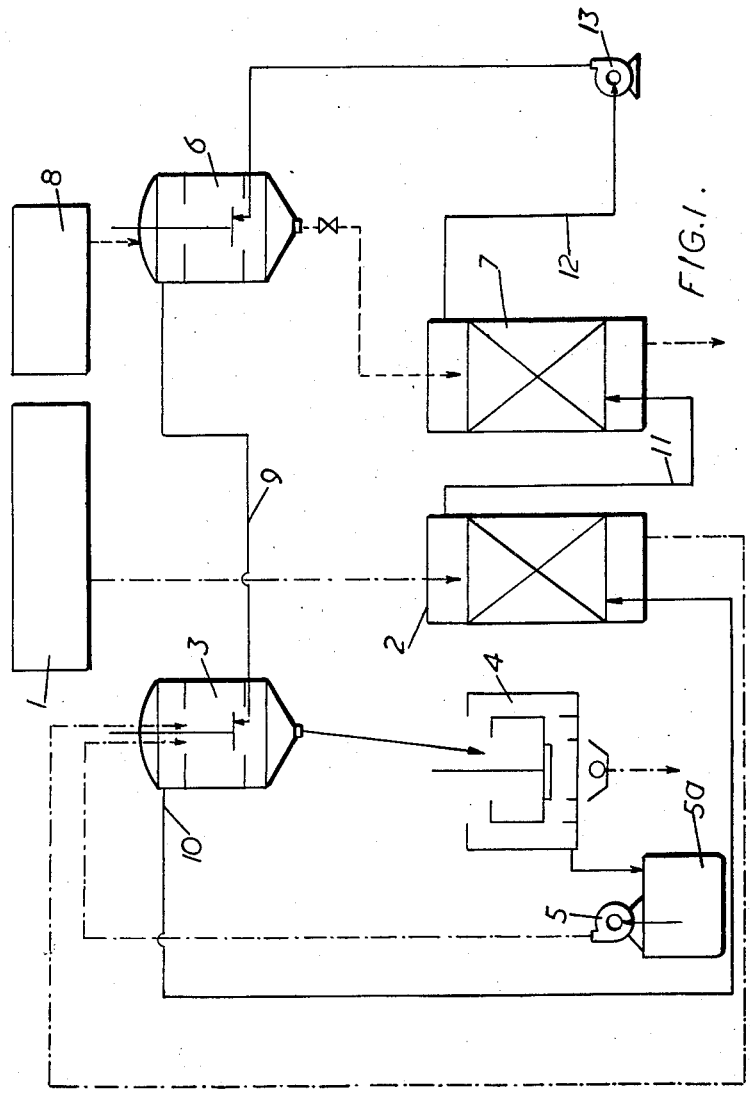

United States Patent Office 2,967,825
Patented Jan. 10, 1961

2,967,825
PROCESS FOR THE ATHERMAL REMOVAL OF WATER FROM AQUEOUS LIQUORS BY AN ORGANIC SOLVENT

Abraham Baniel, Haifa, Israel, assignor to Makhtsavei Israel, Hakiria, Tel Aviv, Israel, an Israeli company Filed Nov. 25, 1958, Ser. No. 776,266
Claims priority, application Israel Dec. 26, 1957
4 Claims. (Cl. 210—21)

The present invention relates to a method for the athermic removal of water from an aqueous liquor. In the context of this invention the term "aqueous liquor" means aqueous solutions, suspensions or emulsions in which the dissolved, suspended or emulsified matter, herein collectively called "dispersed phase," is substantially non-volatile, and includes even non-collodial dispersions such as industrial sludges or the like. The term "athermic" means without extraneous supply of heat, without implying that the temperature has to be kept strictly constant.

The removal of water from aqueous liquors under athermic conditions is sometimes of great technical importance, for example, where fuel is not available at the site of the operation, or where the removal of water by distillation would render uneconomical an operation that could be made economical if the water were removed by some other means, or where the solute or disperse matter is heat-sensitive and apt largely to disintergrate during the thermal removal of the water.

If an aqueous liquor is placed in a closed space near another aqueous liquor or a water-soluble solid of lower partial water vapour pressure, water vapour passes from the former to the latter until two liquors of equal partial water vapour pressure have been formed.

If air is the medium of this water transfer, the process is rather slow. It has now been found that the process can be accelerated so much that it can be used industrially if the water transfer is effected by the use of a circulating liquid transfer medium which is partly miscible with water but does not dissolve any of the solutes or disperse matter of either solution.

According to the invention, an organic solvent of limited water-miscibility, in which the solute or dispersed phase of the aqueous liquor whose water content is to be reduced (herein called "donor liquor") is insoluble, is circulated between the latter and a second medium (herein called "acceptor") constituted by an aqueous liquor of lower partial water vapour pressure than that of the former, or by a solid soluble in the transferred water with the formation of a saturated solution whose partial water vapour pressure is lower than that of the donor liquor, so as to carry water from the donor to the acceptor.

The term "solvent of limited water-miscibility" includes not only such organic solvents as have a limited miscibility only with water by itself, but also such organic solvents whose miscibility is unlimited in the case of pure water but limited at room temperature if the water contains in solution such solutes as are insoluble or difficulty soluble in the organic solvent.

The process may be carried out in batches or in a continuous liquid flow system, in which latter case the solvent is preferably contacted in countercurrent with the donor liquor and acceptor.

Upon contact of the solvent with the donor liquor, water distributes between the aqueous and solvent phases, which latter takes up the more water, the higher the partial water vapour pressure of the former. When now the solvent is bought into contact with the acceptor and the solvent contains at that moment more water than corresponds to the equilibrium of distribution of water between the solvent and acceptor, the latter takes up water from the solvent until the equilibrium of distribution is established between the two media. When the moist solvent is next circulated to the donor liquor, it takes up some more water from it, and this it gives off again to the acceptor, and so forth. This process can be continued as long as a difference in partial water vapour pressure exists between the donor liquor and the acceptor.

Another useful application of the method according to the invention is the concentration of diluted aqueous solutions by partial dehydration, preferably in that range of concentration of the donor in which the water transfer is particularly efficient, while the completion of the dehydration may, if desired, be carried out by the conventional methods. Such a procedure will in some cases be more economical than the complete dehydration by either the conventional method or the method according to the invention.

The acceptor may be a liquor from the outset, or it may originally be a solid which is dissolved by the water carried by the solvent. In the latter case the liquor may be kept in contact with undissolved solute and will then remain saturated and invariant. Where the process is carried out in a continuous liquid flow system, the outflowing saturated acceptor liquor may be withdrawn altogether, or it may be used again as an acceptor in a further stage of the process.

Examples of transfer solvents which can be used for carrying out the method according to the invention are $C_3$–$C_6$ aliphatic alcohols, lower aliphatic ethers, ketones such as methyl-ethyl ketone, and the like. Of these, the alcohols will usually be preferred because they are most readily available. However, where one of the solutes is soluble in alcohol (e.g. $CaCl_2$ at or near saturation thereof in the donor), another solvent of the kind referred to will have to be used instead. Monohydric alcohols are suitable in many cases. N-butanol and sec-butanol which present a considerable solvent power for water, are commercially available at accessible prices and their removal from aqueous solution is easy as they form azeotropes with water which boil below 100° C. N-propanol, which is completely miscible with pure water, is useful with certain salts such as lithium nitrate, in the presence of which a separate alcoholic phase is formed. Ketones such as methylethyl ketone are suitable transfer media for systems containing salts which are soluble in alcohols. Thus the butanols are not suitable for concentrated $MgCl_2$ as the salt distributes between the two phases, whereas methylethyl-ketone is very suitable as it does not dissolve $MgCl_2$ at all. Other organic solvents such as the $C_4$ to $C_8$ aliphatic amines e.g. n-hexyl-amine and di-n-propylamine or more complex oxygenated solvents such as the ether-alcohols (e.g. butyl Cellosolve) may be used with aqueous systems containing solutes soluble in the more common solvents (e.g. glycerol which is soluble in $C_4$ alcohols).

The $H_2O$-transfer capacity of a given quantity of a specified acceptor is a function of the partial water vapour pressure of the donor liquor. The following table shows, by way of example, the dehydrating capacity of 1 ton of originally solid sodium chloride in removing various quantities of water from the saturated aqueous solutions of the substances indicated whereby the later are precipitated:

| Sat. aqueous solution of | NH$_4$Cl | (NH$_4$)$_2$SO$_4$ | KCl or sucrose | KI | KHCO$_3$ | NaHCO$_3$ | CuSO$_4$ |
|---|---|---|---|---|---|---|---|
| Tons of H$_2$O transferable by 1 ton of NaCl | 4.0 | 4.35 | 5.4 | 6.7 | 11.1 | 25 | 50 |

In practice, the dehydration achieved may easily attain about 90% of the theoretical dehydrating capacity.

Where solid NaCl is used as an acceptor and the donor liquor is diluted and has to be concentrated, a large quantity of water can as a rule be taken up by the acceptor until its partial vapour pressure becomes equal to that of the donor liquor, e.g. 10 tons of water by each ton of NaCl in the case of a 30% by weight aqueous solution of NH$_4$Cl to be concentrated up to 40%.

A main application of the method according to the invention is precipitation or crystallization of solid solutes from their aqueous solutions. If the water transfer is carried out in batches, the circulation of the solvent will be continued until the desired amount of water has been removed from the donor solution.

If the method according to the invention is carried out in countercurrent, the donor liquor may be fed continuously to one end of an extractor where it is brought into countercurrent contact with the solvent and at the other end of the extractor a slurry composed of the donor liquor concentrated to saturation and pecipitated solute is withdrawn. After removal of the precipitate the saturated mother liquor is recycled to the extractor. Simultaneously, the acceptor is continuously fed in the solid state to the extractor and the resulting saturated acceptor solution is continuously withdrawn from it. If desired, the water transfer may be carried out in two stages in that the water-carrying solvent separated from the donor liquor is contacted in a first extractor with the acceptor effluent withdraw from the second extractor to which the acceptor is fed as a solid, and the partly dehydrated solvent is then fed to the second extractor.

Some amount of solvent dissolves in the acceptor liquor and may be recovered from the latter, e.g. by distillation. It is true that some fuel has to be expended for this recovery, but the amount thereof is incomparably smaller than the amount that would be required if the dehydration itself were done thermally. Similarly, in some cases it may be advantageous to recover the solid acceptor from the spent acceptor liquor, equally by distillation which, in this case will at the same time serve for the recovery of the solvent from the acceptor liquor. This may be done, for example, where the process of dehydration according to the invention is resorted to primarily not with a view to saving fuel but in order not to expose the donor liquor, or the equipment in which it is handled, to thermal treatment.

The invention is illustrated by the following examples with reference to the annexed drawings, which are flow sheets of two different water removal processes according to the invention.

Figure 2:
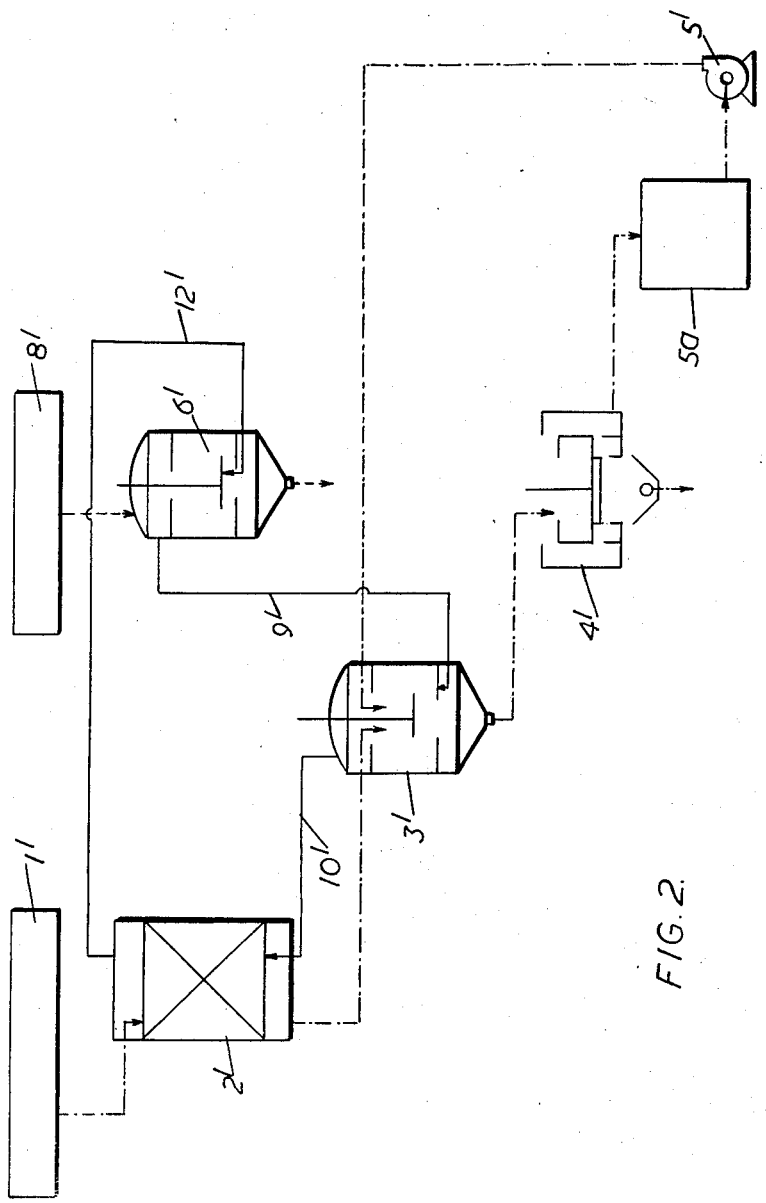

Fig. 1 shows in diagrammatic elevation the several parts of a water-removal plant whose details are described below in connection with Example 1, and Fig. 2 shows similarly another plant which is described in detail in Example 3.

*Example 1.—Conversion of KCl to KHCO$_3$ via KOH*

The conversion of KCl into KHCO$_3$ with intermediate production of KOH with the aid of ion exchangers is known as a laboratory process which, however, could so far not be performed commercially in an economical manner owing to the difficulty of isolating solid KHCO$_3$ from its aqueous solution. In accordance with the present invention this can easily be achieved as follows:

A solution of 7.53 parts by weight of KOH in 100 parts of water is prepared by the passage of a solution of 10 parts by weight of KCl in 100 parts by weight of water through an anion exchanger. This solution is carbonated by passing through it pure CO$_2$ or a CO$_2$-containing gas at room temperature (about 30° C. or below) until all the KOH is converted into KHCO$_3$, whereby an aqueous solution containing 13.43 parts by weight of KHCO$_3$ and 100 parts of water is obtained. From this solution water is completely removed by water transfer to a KCl solution as an acceptor liquor with 1500 parts by weight of sec.-butanol as water-transfer medium. The cycle of operations required for this process is illustrated in Fig. 1. In this figure the continuous lines designate the path of the solvent, the dashed lines—that of the acceptor (KCl) and the dash-dotted lines—that of the donor (KHCO$_3$).

The donor liquor circuit includes a tank 1, a countercurrent extractor 2, a mixer-settler unit 3, a centrifuge 4, collecting tank 5a and a pump 5. The top of the extractor 2 is connected by a pipe to the tank 1, its bottom to the top of the settling chamber of unit 3, the bottom of which latter is connected to the centrifuge. Any pumps required for the flow of the donor liquor through this system have not been shown.

The acceptor system includes a mixer-settler unit 6 which is connected at the bottor of its settling chamber to the top of an extractor 7, and a storage container 8 for the solid acceptor, connected to the mixing chamber of the unit 6.

The solvent circulation circuit includes a conduit 9 leading from the top of the settling chamber of unit 6 to the mixing chamber of unit 3, a conduit 10 from the top of the settling chamber of unit 3 to the bottom of extractor 2, conduit 11 from the top of extractor 2 to the bottom of extractor 7, and conduit 12 with pump 13 leading from the top of extractor 7 to the mixing chamber of unit 6.

The starting donor liquor contains 13.4 kg. of KHCO$_3$ for each 100 kg. of water. It drops by gravity from tank 1 into the extractor 2 where it is contacted in countercurrent with sec.-butanol as transfer solvent, coming from unit 3 and carrying already some proportion of water to be transferred. The donor liquor effluent from the extractor 2 contains 13.4 kg. of KHCO$_3$ for every 34.4 kg. of water, i.e. the water content of the donor liquor is reduced in extractor 2 by nearly two thirds. This effluent is fed to the mixing chamber of unit 3 where it is brought into intimate contact with transfer solvent stripped in unit 6 from transferred water by contact with fresh acceptor. The donor effluent from unit 3 is a slurry composed of precipitated KHCO$_3$ and saturated KHCO$_3$ mother liquor. This slurry is introduced into the centrifuge 4 where the solid KHCO$_3$ is separated. The solid product is fed into a dryer whereas the mother liquor collects in the tank 5a whence it is re-cycled by means of pump 5 to the mixing chamber of unit 3.

At the same time solid potassium chloride is continuously fed into the mixing chamber of unit 6 where it is brought into intimate contact with transfer solvent carrying transfer water and coming from the extractor 7. The KCl dissolves in unit 6 in the water carried by the solvent whereby the latter is "dried." The KCl-effluent leaving unit 6 flows into extractor 7 where it is contacted in countercurrent with a transfer solvent which, in this instance, comes from the extractor 2 and carries a high proportion of transfer water. Part of this water is transferred to the saturated KCl solution which is thereby diluted and leaves the extractor 2 as an effluent containing 10 kg. of KCl in 100 kg. of water. This solution has the same water vapour pressure as the starting potassium bicarbonate solution and can no longer serve as an acceptor in this system. However, it may serve as a source of potassium chloride in the preparation of KOH for the subsequent conversion to $KHCO_3$, for which purpose it is fed to the ion exchanger. Thus, 13.43 kg. of $KHCO_3$ are separated in solid form from 100 kg. of water by 10 kg. of solid KCl in a two-stage water transfer operation.

The solvent takes up altogether 100 kg. of transfer water in unit 3 and extractor 2, i.e. about 6.5% of its weight. It is stripped of 65.6 kg. water in extractor 7, and of the remainder in unit 6.

The performance of this method is not confined to the concentrations described above. Thus the starting KCl solution may contain much less KCl, e.g. 5 parts by weight for each 100 parts of water, and the resulting $KHCO_3$ solution will accordingly be half as concentrated as that described previously. This dilution requires a larger water-transfer system for a given production of $KHCO_3$, but it is advantageous for the operation of certain anion exchangers, and it still needs no fuel.

*Example 2.—Conversion of NaCl into $NaHCO_3$*

The process is carried out in complete analogy to that according to Example 1. The starting solution contains 8 parts by weight of NaCl for each 100 parts of water and the $NaHCO_3$ solution obtained contains 11.5 parts by weight $NaHCO_3$ for each 100 parts of water. The transfer solvent is 2000 parts by weight of n-butanol.

*Example 3.—Recovery of ammonium sulfate from aqueous solutions*

An aqueous solution of ammonium sulfate, such as may be obtained as a by-product of coke oven operations or by the decomposition of gypsum with ammonium carbonate, is dehydrated with sodium chloride as an acceptor in a plant according to Fig. 2. In the figure the continuous lines designate the path of the solvent, the dashed lines—that of the acceptor (NaCl) and the dash-dotted lines—that of the donor $(NH_4)_2SO_4$.

This plant comprises in the donor liquor circuit a tank 1' for the starting ammonium sulfate solution, connected to the top of a countercurrent extractor 2' whose bottom is connected to the mixing chamber of a mixer-settler unit 3'. The bottom of the settling chamber of this unit is connected to a centrifuge 4', and the latter to a collecting tank 5a' whence the collecting liquid can be recycled to the mixing chamber of unit 3' by a pump 5'.

The acceptor system includes a storage container 8' and mixer-settler unit 6'.

The solvent circuit includes conduit 9' from the settling chamber of unit 6' to the mixing chamber of unit 3', the conduit 10' from the top of the settling chamber of unit 3' to extractor 2', and conduit 12' from extractor 2' to unit 6'.

From tank 1' a 30% ammonium sulfate solution containing 0.428 ton of ammonium sulfate per ton of water is introduced continuously into extractor 2', which is continuously supplied through conduit 10' with solvent carrying some proportion of transfer water. The saturated ammonium sulfate solution flows from the extractor 2' into the mixing chamber of unit 3' where it is contacted with solvent stripped in unit 6' from the transfer water. The donor effluent from unit 3' is an aqueous slurry of ammonium sulfate which is introduced into a centrifuge 4' where the precipitated solid ammonium sulfate is separated. The saturated mother liquor is drawn off into tank 5a' from where it is pumped by pump 5' back into the mixing chamber of unit 3'.

At the same time solid sodium chloride is continuously fed from reservoir 8' into the mixing chamber of unit 6' where it is brought into contact with the water-carrying solvent coming from extractor 2'. The sodium chloride dissolves in the water stripped from the solvent, and the acceptor effluent from unit 6' is a solution of 0.35 part by weight of sodium chloride in one part of water. This is withdrawn and fed to a solvent recovery plant. The partly dried solvent flows into the mixing chamber of unit 3' where it takes up water from the saturated aqueous ammonium sulfate solution deriving from extractor 2'.

As water transfer solvents for this operation there may be used sec.-butanol, a mixture of i-propanol and sec.-butanol in the range of 1:1 and 2:1, n-butanol, methyl-ethyl ketone, or the like.

The operation according to this example is a one-stage water-transfer cycle and does, therefore, not fully utilize the dehydrating capacity of NaCl, which for a 30% ammonium sulfate solution is 4–5 tons of water per ton of solid sodium chloride. For the full utilization of this capacity another extraction step would have to be added, as in Example 1. However, this would not only increase the volume of the equipment but also the quantity of the solvent from one ton to 2.3–3.0 tons per ton of ammonium sulfate.

The use of sodium chloride as an acceptor does not only save fuel but also permits the use of equipment that need not be heat resistant. Thus plastic linings can be used whereas in the known thermal dehydration of ammonium sulfate solutions, expensive stainless steel equipment is required.

*Example 4.—Recovery of sylvinite from Dead Sea waste brines*

Aqueous brines saturated in both NaCl and KCl are obtained as mother liquors or washing liquors at some stages of the recovery of potassium chloride from Dead Sea water. For example, a brine saturated with respect to KCl and NaCl and having a specific gravity of 1.23 at 27° can be dehydrated by counter-current water transfer with sec.-butyl alcohol containing originally 6% of $H_2O$. The outgoing alchololic phase contains 7% $H_2O$ and the aqueous effluent contains in suspension crystals of NaCl and KCl in quantities proportional to the quantity of $H_2O$ removed. The solids are separated by flotation and the excess mother liquor is returned to dehydration. The solvent is dried by countercurrent contact with 10% of its volume of "end brine" (containing mainly NaCl, $MgCl_2$ and $CaCl_2$ and having the specific gravity 1.27 at 27°C.) to a content of 6% $H_2O$ and recycled. The outgoing end-brine is treated for solvent recovery.

*Example 5.—Recovery of KI from aqueous solutions*

A potassium iodide solution of 50% by weight is dehydrated by a $CaCl_2$ brine of 20% using iso-amyl alcohol as water-transfer medium. Two countercurrent hydration-dehydration cycles are involved analogous to those of Example 4. The diluted $CaCl_2$ brine (11% by weight) is heated to distil off the dissolved solvent, and reconcentrated by thermal evaporation to 20%.

KI is sensitive to heat and light and its aqueous solution cannot be concentrated in ordinary steel equipment and by direct heating without undesirable decomposition and contamination. However, in accordance with the present invention, its aqueous solution is concentrated isothemally while the thermal evaporation is shifted to a heat-insensitive and non-corrosive auxiliary acceptor liquor such as the $CaCl_2$ solution described herein.

*Example 6*

A solution of 7.35 parts by weight of KOH in 100 parts by weight of water can be concentrated to 16 parts by weight of KOH per 100 parts of water by the use of 10 parts by weight of solid KCl as acceptor and sec.-butanol as transfer medium.

A solution containing 16 parts by weight of KOH per 100 parts by weight of water is suitable for many industrial uses such as certain scouring operations or the like. As shown, such a solution can easily be prepared in situ in accordance with the present invention. This procedure is considerably cheaper than the conventional dissolution of solid KOH in water.

*Example 7*

Rock salt containing clays and other impurities is purified by dissolution in water, removal of the solids by filtration or decantation, followed by evaporation of the clear liquor in order to recover purer salt. It is generally desirable to operate with saturated solutions as they carry the minimum amount of water which must be evaporated. However, for decantation more dilute solutions are advantageous as they permit easy settling. The difficulty may be overcome by the present method as follows:

A sodium chloride solution containing five parts of $H_2O$ for every part of NaCl is dehydrated to 3.3 parts $H_2O$ per 1 part NaCl (near saturation) by transferring the water to crude rock salt containing one part of NaCl. The concentrated pure NaCl solution is sent to evaporation and the slurry of crude NaCl and water is further diluted by water to 5 to 1 and purified by decantation.

The techinque used is similar to that of Example 3 and di-n-propylamine and sec-butanol are particularly suitable solvents.

I claim:
1. A process for the athermic concentration of an aqueous donor liquor containing a disperse phase, wherein an organic solvent of limited water-miscibility in which the dispersed phase of the donor liquor is insoluble, is circulated between the latter and an acceptor having a lower partial water pressure than the donor liquor, thereby to carry water from the donor liquor to the acceptor.
2. A process according to claim 1, wherein the acceptor is originally a solid which is dissolved by the water carried by the solvent.
3. A process according to claim 2, wherein the saturated acceptor solution formed upon contact of the solid acceptor with the wet solvent, is used for another transfer step.
4. A process according to claim 1 wherein the acceptor is an aqueous solution from the outset.

References Cited in the file of this patent

UNITED STATES PATENTS

Re. 15,783    Hammond _____ Mar. 4, 1924

OTHER REFERENCES

Saline Water Conversion Report for 1955, U.S. Department of Interior, January 1956, pages 52, 54 and 56 relied upon.

Saline Water Conversion Report for 1957, U.S. Department of Interior, January 1958, pages 66, 68 and 69 relied upon.